S. O. LARSON.
ATTACHMENT FOR CULTIVATORS.
APPLICATION FILED DEC. 4, 1917.
1,267,425.
Patented May 28, 1918.
2 SHEETS—SHEET 1.
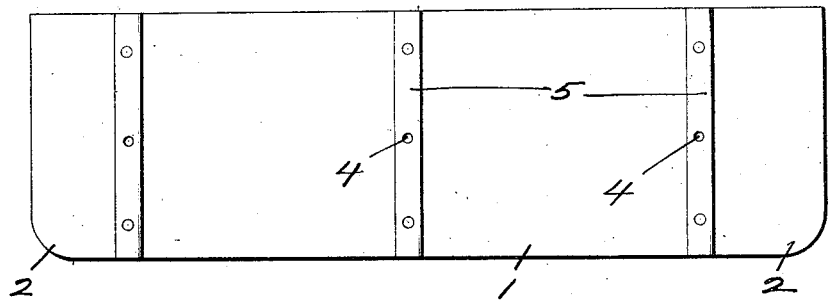
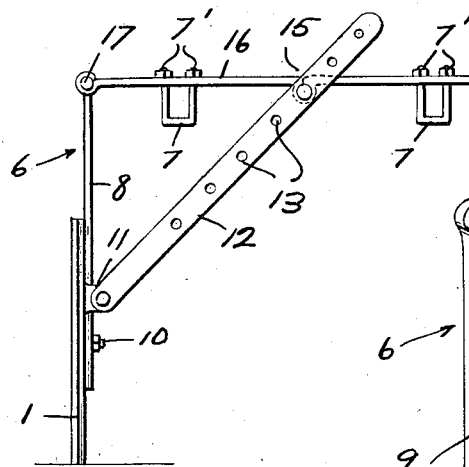
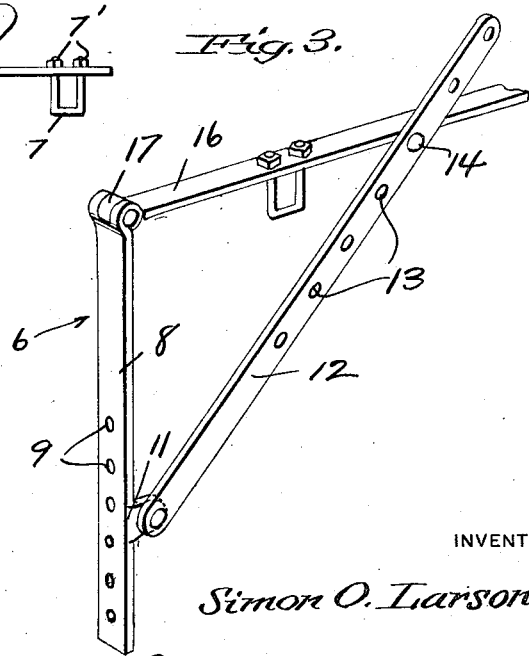
INVENTOR
Simon O. Larson,
BY Richard B. Owen,
ATTORNEY
WITNESSES
G. Hennesy
S. M. McColl, S. O. LARSON.
ATTACHMENT FOR CULTIVATORS.
APPLICATION FILED DEC. 4, 1917.
1,267,425.
Patented May 28, 1918.
2 SHEETS—SHEET 2.
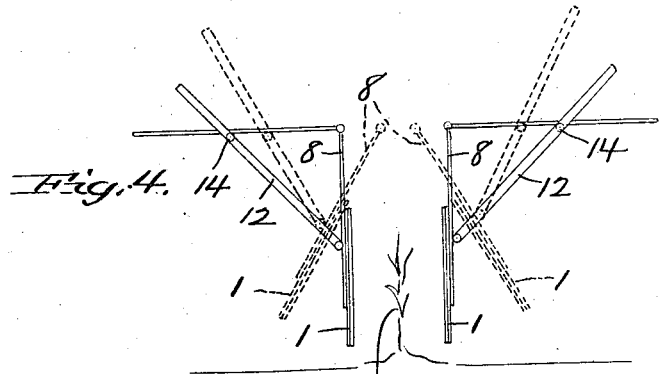
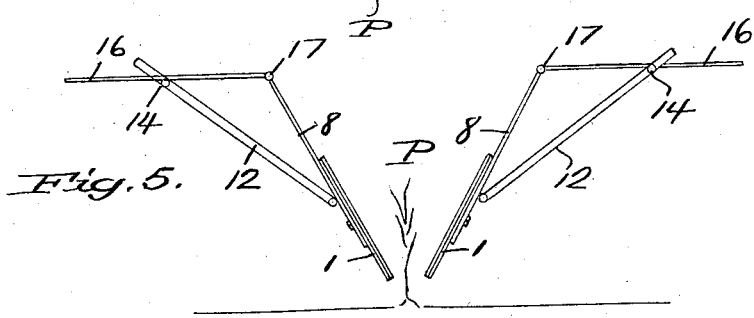
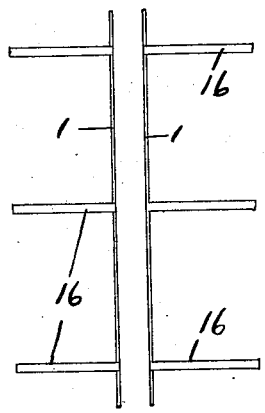
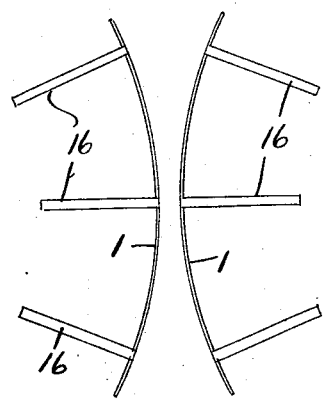
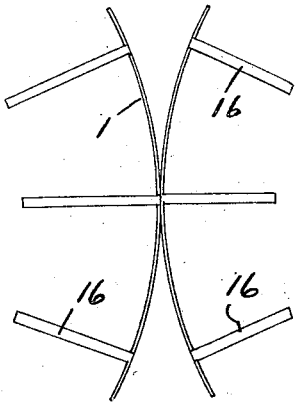
INVENTOR
Simon O. Larson,
BY
ATTORNEY
WITNESSES

UNITED STATES PATENT OFFICE.

SIMON O. LARSON, OF PIPESTONE, MINNESOTA.

ATTACHMENT FOR CULTIVATORS.

1,267,425.      Specification of Letters Patent.      Patented May 28, 1918.

Application filed December 4, 1917. Serial No. 205,393.

*To all whom it may concern:*

Be it known that I, SIMON O. LARSON, a citizen of the United States, residing at Pipestone, in the county of Pipestone and State of Minnesota, have invented certain new and useful Improvements in Attachments for Cultivators, of which the following is a specification.

This invention relates to attachments for cultivators and more particularly to fenders or plant shields for use in connection therewith.

The object of the invention is to provide a simple and efficient attachment of this character capable of many adjustments for various uses, and which, when adjusted will be held rigidly so that the plants being cultivated will not be disturbed or covered up no matter how violently the shovels may throw the earth against the fenders.

Another object is to provide a fender of this character which will not sag under the weight of dirt or mud adhering thereto and hence may be set close to the plants to be worked without danger of injuring them.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of one of the fender plates or shields constituting a part of this attachment.

Fig. 2 is an end view of the attachment showing one shield and one of the supports therefor.

Fig. 3 is a perspective view of one of the shield supports.

Fig. 4 is a front elevation of the attachment shown in operative relation to a plant being cultivated, the shields being shown in full lines in upright parallel position and in dotted lines in diverging relation.

Fig. 5 is a similar view showing the shields with their lower ends converging and their supports in the position necessary to hold them in this relation.

Fig. 6 is a plan view of the attachment shown in the full line position of Fig. 4.

Fig. 7 is a similar view showing a modified form, the fenders curved longitudinally and diverging at their opposite ends, and Fig. 8 is a similar view showing another form with the fenders in contact at their center portions and diverging at their ends, this being an extreme adjustment not used in the field.

In the embodiment illustrated the attachment constituting this invention comprises two shields or plates 1 which are exactly alike and hence one only will be described in detail. These shields, one of which is shown in side elevation in Fig. 1, each consists of a sheet iron plate of suitable size and thickness, being preferably about one-sixteenth of an inch thick and rectangular in form with its lower corners 2 rounded.

A plurality of cross braces 5 are riveted to one face of the plate at longitudinally spaced intervals and through which and the plate extend bolt apertures 4, one being shown in each brace for the passage of the bolts which connect the plate to its supports.

These fenders or shields 1 are adjustably mounted on a plurality of supports 6, three being provided for each plate and which are designed to be detachably carried by the cultivator beams, not shown. U-shaped clips 7 are provided for connecting the supports to the beams, which latter extend through these clips and are clampingly engaged thereby, the legs of the clips being shown extended through horizontal members of the supports and provided with nuts 7' for holding them in adjusted position.

The supports 6, three of which are used for each plate, are exactly alike and each comprises an upright metal bar 8 provided with a plurality of longitudinally spaced apertures 9 for the reception of a bolt 10 which also passes through one of the holes 4 in a brace 5 of one of the plates 1 (see Fig. 2).

Apertured lugs as 11 extend rearwardly from each of the bars 8 and each is designed to pivotally support a link or brace 12 here shown constructed of strap iron and provided with a plurality of longitudinally spaced apertures 13, any desired number of which may be formed in said link and which are designed for adjustably connecting the link to an other bar or arm 16 of the support. A bolt 14 is shown for effecting this connection and extends through one of the apertures 13 and a bearing 15 carried by the member 16 and here shown depending therefrom at a point beyond the center of said member.

The arm 16 is also constructed of strap iron and has one end hingedly connected with the other end of bar 8 as is shown at 17.

The plates 1 may be adjusted vertically on the uprights 8 of their supports by removing the bolts 10 and extending them through one of the apertures 9 at the point at which it is desired to connect the plate, it being obvious that the plate may be thus raised or lowered at the will of the operator. It will also be obvious that owing to the fact that three supports are employed for each plate, one bolt 10 only need be used for each support.

As shown in Fig. 4, the plates 1 are arranged vertically in upright position parallel with each other on opposite sides of the row of plants indicated at P to be cultivated, and when properly positioned the bolts 14 are passed through the proper aperture 13 in the links 12 and said plates thus rigidly held against lateral movement. When for any reason it is desired to position these plates as shown in dotted lines in Fig. 4 with their lower ends diverging, thereby positioning them a greater distance from the plants to be cultivated, the bolts 14 are again removed and after this adjustment is effected they are replaced in the bearings 15 after first having been passed through the proper aperture 13 for effecting this connection.

When it is desired to position the shield or plates 1 closer to the plants to be cultivated, the bolts 14 are removed and said plates adjusted to the position shown in Fig. 5, when the bars 8 will be arranged at an obtuse angle to their coöperating arms 16 and they may be rigidly secured in this position by again passing the bolts 14 through the proper apertures in links 12 and through the bearings 15 in the arms 16.

One or all of the fender supports may be moved to or from the plants to be cultivated by loosening the clips 7 and adjusting them on the cultivator beams.

From the above description it will be obvious that by the bracing means herein employed the fenders after being positioned and the braces or links 12 secured by the bolts 14 will remain rigidly no matter how violently the shovels may throw dirt against them. This rigid mounting of the fender plates operates to protect the plants and prevents the roots thereof from being loosened or their tops from being covered up. Moreover, this bracing connection of bars 8 and arms 16 will prevent all possibility of the plates sagging when dirt or mud adhere thereto.

The fenders may oftentimes be adjusted as shown in Fig. 7, this adjustment being especially useful in cultivating crooked rows of corn or other plants so that the fenders will be close to the corn only where the front shovels operate. Thus the front and rear ends of the fenders will not roll any lumps against the plants. When the fender is forced to one side quickly to save uprooting of a crooked hill of corn, the rear part of the fender will not push the passing plant down nor force any lumps of earth against it.

While the fenders herein shown and described may weigh a few pounds more than those of ordinary construction the great advantages derived from their use owing to their variety of adjustment and rigidity in action will entirely compensate for the additional weight.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

I claim:—

1. A plant shield for cultivators comprising a pair of plates, a plurality of supports for connecting said plates to cultivator beams, each of said supports comprising a pair of bars hingedly connected at one end, means for adjustably connecting said bars to each other at points beyond their pivotal connection, means carried by one of said bars for adjustable connection to said plates, and means carried by the other bar for adjustably connecting it to a beam.

2. A shield attachment for cultivators comprising an upright plate, a support therefor composed of two bars hingedly connected together at one end, means carried by one of said bars for adjustable connection with said plate, means carried by the other bar for adjustable connection with a cultivator, and a brace pivotally connected at one end to said first mentioned bar and adjustably connected with the other bar.

3. A plant shield for cultivators comprising a plate having cleats arranged transversely thereof in longitudinally spaced relation, a pair of bars hingedly connected together at one end, one of said bars being provided with a plurality of longitudinally spaced apertures for adjustably connecting it to said plate, an apertured lug extending rearwardly from said bar, bearings carried by the other bar at a point beyond its pivotal connection, a link pivotally connected at one end with said apertured lug and provided with a plurality of longitudinally spaced apertures, a bolt extending through one of said apertures and engaging the bearing in the other bar whereby said bars are adjustable relative to each other to position said plate at any desired angle, and U-shaped clips carried by the bar having the bearing to adapt it for connection to a cultivator beam.

In testimony whereof I affix my signature in presence of two witnesses.

SIMON O. LARSON.

Witnesses:
P. P. CADY,
E. P. CADY.

Copies of this patent may be obtained for five cents each, by addressing the "Commissioner of Patents, Washington, D. C."